United States Patent
Shmilovich et al.

(10) Patent No.: US 7,823,840 B2
(45) Date of Patent: Nov. 2, 2010

(54) SYSTEMS AND METHODS FOR CONTROL OF ENGINE EXHAUST FLOW

(75) Inventors: Arvin Shmilovich, Huntington Beach, CA (US); Yoram Yadlin, Irvine, CA (US); Robert D. Gregg, III, Fullerton, CA (US); Roger W. Clark, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 99 days.

(21) Appl. No.: 11/927,257

(22) Filed: Oct. 29, 2007

(65) Prior Publication Data

US 2009/0108125 A1   Apr. 30, 2009

(51) Int. Cl.
*B64C 3/50* (2006.01)
(52) U.S. Cl. .................. 244/215; 244/213; 244/198
(58) Field of Classification Search ................ 244/198, 244/201, 207, 213, 215
See application file for complete search history.

(56) References Cited

U.S. PATENT DOCUMENTS

| | | | | |
|---|---|---|---|---|
| 3,841,588 A | * | 10/1974 | Arnold et al. ................ | 244/207 |
| 3,887,146 A | * | 6/1975 | Bright ......................... | 244/12.1 |
| 3,893,638 A | * | 7/1975 | Kelley ........................ | 244/12.5 |
| 4,019,696 A | * | 4/1977 | Hirt et al. .................. | 244/200.1 |
| 4,326,686 A | * | 4/1982 | Runge ......................... | 244/207 |
| 4,391,424 A | * | 7/1983 | Bartoe, Jr. ................... | 244/207 |
| 4,392,621 A | * | 7/1983 | Viets .......................... | 244/12.5 |
| 4,426,054 A | * | 1/1984 | Wang .......................... | 244/212 |
| 4,447,028 A | * | 5/1984 | Wang .......................... | 244/212 |
| 4,845,939 A | * | 7/1989 | Jordan et al. ............... | 60/226.1 |
| 6,682,021 B1 | * | 1/2004 | Truax et al. ................. | 244/201 |
| 6,926,229 B2 | * | 8/2005 | Cummings et al. .......... | 244/12.5 |

FOREIGN PATENT DOCUMENTS

WO  PCT/US2008/076857   9/2008

OTHER PUBLICATIONS

"YC-14 Advanced Medium STOL Transport (AMST)", http://www.globalsecurity.org/military/systems/aircraft/c-14.htm.

* cited by examiner

*Primary Examiner*—Timothy D Collins
*Assistant Examiner*—Justin Benedik
(74) *Attorney, Agent, or Firm*—Tung & Associates

(57) ABSTRACT

Coanda Effect and lift produced along a surface of an airfoil are increased by ducting compressed fluid from the engine to the surface of the airfoil. An engine produces exhaust gases that are predominantly directed toward an aft end of the aircraft by a cowling or other structure as an exhaust plume. One or more internal ducts extend from the engine to the surface of the airfoil to thereby transmit a compressed fluid from the engine to the surface in order to suppress flow separation along the surface, thereby causing the engine exhaust flow to remain attached to the surface over a wider span. Such structures and techniques may find particular use in aircraft designed to exploit upper surface blowing (USB) techniques and structures for short takeoff and landing (STOL) performance.

20 Claims, 3 Drawing Sheets

SYSTEMS AND METHODS FOR CONTROL OF ENGINE EXHAUST FLOW

TECHNICAL FIELD

Various embodiments described herein generally relate to controlling engine exhaust in an aircraft, and particularly relate to methods and apparatus for increasing engine-powered lift produced along a surface of an aircraft through control of engine exhaust.

BACKGROUND

Scientists and engineers continue to seek improvements in all areas of aircraft performance. Recent military campaigns, for example, have demonstrated an increased need for improved short takeoff and landing (STOL) performance to allow aircraft to operate in environments where sophisticated airports and other landing facilities may not be available. In particular, it is desirable to create aircraft that are able to takeoff and/or land even on relatively short runways.

One way to improve STOL performance is to increase the amount of lift produced along the airfoil surfaces of the aircraft. By increasing the amount of lift produced by each wing, for example, the aircraft can become airborne at a lower airspeed, thereby reducing the amount of runway needed for takeoff. Various aircraft designs have attempted to maximize the amount of lift produced along an airfoil surface through exploitation of the well-known Coanda Effect. In many of these designs, air moving over the wing can be "bent down" towards the ground using flaps and a jet blowing over a curved surface to increase the amount of lift produced. Aircraft that have successfully exploited the Coanda Effect for STOL purposes include the Boeing YC-14 as well as various unmanned aerial vehicles (UAVs) and the like. Nevertheless, there remains a desire for aircraft designs with even better STOL performance.

BRIEF SUMMARY

According to various exemplary embodiments, lift produced along a surface of an airfoil is increased during takeoff, landing and/or other appropriate stages of flight by ducting compressed fluid from the engine to the surface of the airfoil. An engine produces exhaust gases that are predominantly directed toward an aft end of the aircraft by a cowling or other structure as an exhaust plume. One or more ducts extend from the engine to the surface of the airfoil to thereby transmit a compressed fluid from the engine to the surface in order to suppress flow separation along the surface, thereby causing the engine exhaust flow to remain attached to the surface over a wider span segment. Such structures and techniques may find particular use in aircraft designed to exploit upper surface blowing (USB) techniques and structures for short takeoff and landing (STOL) performance. Through the judicial application of the injection fluid at critical regions, design objectives can generally be met using only a very small quantity of fluid.

Various embodiments provide an aircraft comprising an airfoil having a cowling extending outwardly from a surface of the airfoil. An engine is coupled to the airfoil and configured to produce exhaust gases that are predominantly directed toward an aft end of the aircraft by the cowling as an exhaust plume. One or more ducts extend from the engine to the surface of the airfoil to transmit a compressed fluid from the engine to the surface of the airfoil without passing through the cowling.

In other embodiments, an airfoil is configured for providing lift to an aircraft having an engine. An engine cowling extends outwardly from a surface of the airfoil such that an exit plane in the cowling is configured to direct an exhaust plume emanating from the engine across at least a portion of the surface. A plurality of ducts is formed in the airfoil and each duct is configured to transmit a compressed fluid from the engine to the surface of the airfoil.

In still other embodiments, a method for increasing the lift produced along a surface of an airfoil of an aircraft having an engine is provided. The engine of the aircraft is operated to thereby produce exhaust gases. A majority of the exhaust gases are directed along the surface of the airfoil. One or more ducts extending from the engine to the surface of the airfoil are activated to thereby transmit a compressed fluid from the engine to the surface and to suppress flow separation along the surface while the duct(s) remain activated.

BRIEF DESCRIPTION OF THE DRAWINGS

Various embodiments will hereinafter be described in conjunction with the following drawing figures, wherein like numerals denote like elements.

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

Generally speaking, the amount of lift produced along a surface of an aircraft can be increased by improving the flow of air over the surface. Especially in the case of STOL aircraft designed to exploit the Coanda Effect, lift can be reduced by three-dimensional effects whereby air flowing across an airfoil detaches from the surface of the aircraft. By restricting the three-dimensional effects of airflow and instead encouraging two-dimensional flow across the surface, lift produced by Coanda airflows along the surface can be increased.

One way to reduce three-dimensional airflow along a surface of an aircraft is to provide a system of ducts that direct streams of compressed fluid (e.g. engine exhaust or other compressed air) from the engine to appropriate locations on the surface of an airfoil. The ducted streams suitably suppress airflow separation and/or otherwise encourage airflow in a two-dimensional manner across a wider section of the airfoil surface. Such ducts can be deployed at least during takeoff and/or landing to provide augmented lift, and may be switched off during level flight and/or at other times as appropriate. By reducing three-dimensional effects of airflow over the airfoil surface while the ducts are active, the Coanda Effect produced on the surface of an airfoil can be increased, thereby resulting in increased lift and improved STOL performance for the aircraft.

Figure 1:
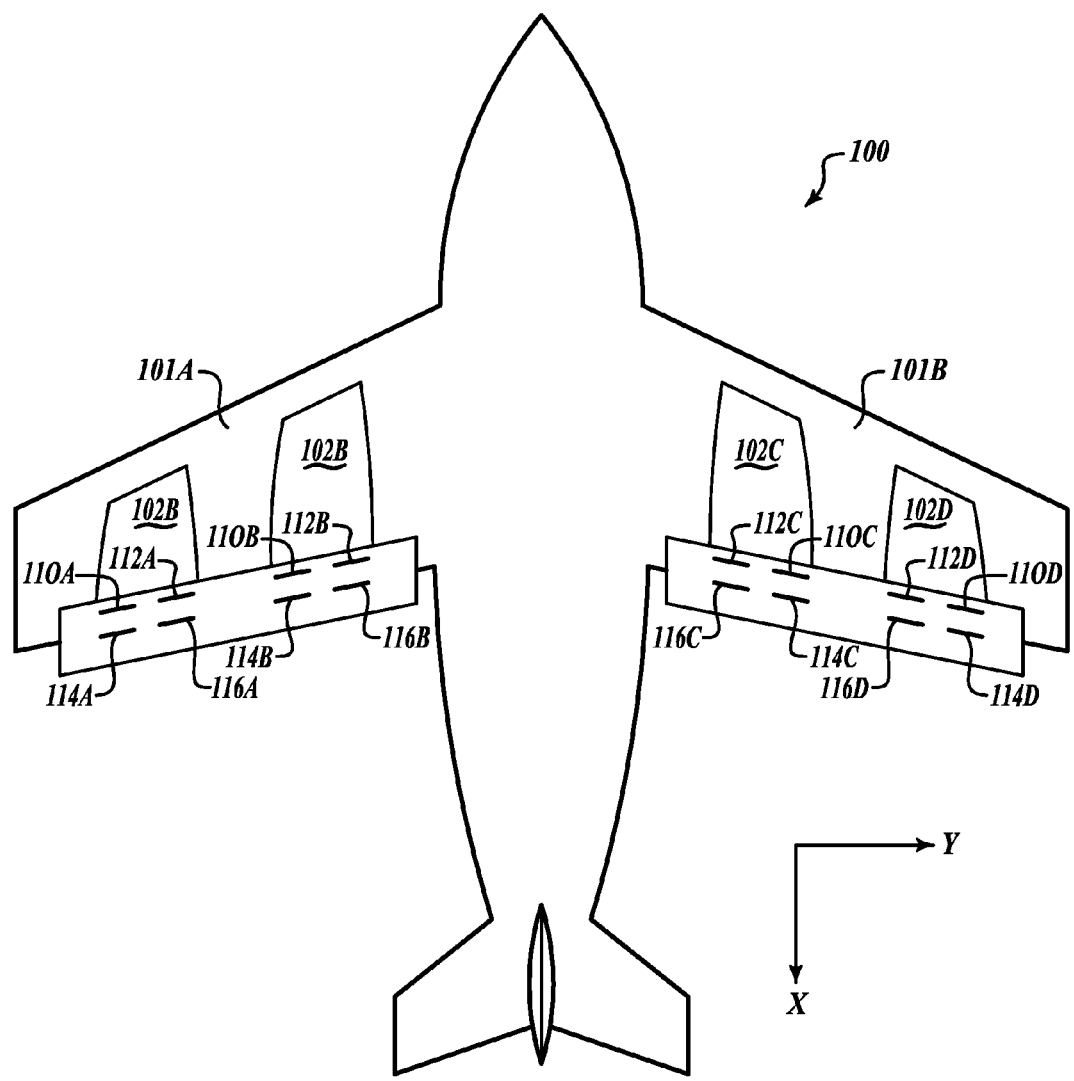
FIG. 1 is a top view of an exemplary aircraft with improved lift capabilities produced through control of engine exhaust flow.

With reference now to FIG. 1, an exemplary aircraft 100 suitably includes one or more airfoils 101A-B that produce lift in response to fluid flow across the surface of the airfoil. In various embodiments, aircraft 100 exploits Coanda Effects produced along the airfoils 101A-B for improved STOL performance. To that end, aircraft 100 may include any number of engines that produce exhaust gases expelled along the surfaces of airfoils 101A-B toward the rear end of aircraft 100. Engine exhaust may emanate from engine cowlings 102A-D, for example, which suitably extend outwardly from the surfaces of airfoils 101A-B. Engine exhaust may alternately be applied to the airfoils 101A-B from sources other than cowlings 102A-D, such as a nozzle or other structure attached to the engine.

The exhaust gases may be directed along a surface of a flap 104A-B or other control surface associated with airfoil 101A-B as appropriate. In various embodiments, flaps 104A-B are extended during takeoffs and/or landings that demand STOL performance, and engine exhaust from cowlings 102A-D suitably flows across the surfaces of flaps 104A-B to provide increased lift using Coanda Effects. In many embodiments, aircraft 100 is designed to exploit "upper surface blowing" (USB) principles wherein engine exhaust is directed along an upper surface of a wing, flap and/or other airfoil structure to maximize lift produced. One example of an aircraft design that exploits USB effects to produce increased lift across a wing/flap structure is described in U.S. Pat. No. 6,926,229, although many other designs could be equivalently applied.

In various embodiments, two-dimensional airflow across the surface of airfoils 101A-B is encouraged through the use of ducts that conduct compressed fluid from an engine or other source to the surface of the airfoil. By properly injecting airflow along the surface of airfoil 101A-B, engine exhaust is encouraged to efficiently turn along the surface of the airfoil (rather than peeling away from the surface), thereby increasing Coanda Effects and augmenting total lift.

The various ducts contained within any airfoil 101 may be arranged in any manner. Ducts may originate within any portion of an engine, for example, such as the engine compressor or engine fan, or from any other source of bleed air and/or exhaust. Any number of ducts may be provided, and embodiments with multiple ducts may arrange and/or group the ducts in any manner desired to achieve desired results. In many embodiments, the various ducts terminate at a slot or other opening in airfoil 101. In practice, the slots may simply be implemented as small openings in the airfoil 101 that inject compressed fluid when actuated. Slots 110A-D, 112A-D, 114A-D, 116A-D in airfoils 101A-B, for example, can be arranged in any manner and at any size to distribute fluid conducted by the ducts. In the exemplary aircraft 100 shown in FIG. 1, each engine cowling 102 has four slots 110, 112, 114, 116 that are capable of directing compressed fluid as desired, and as described more fully below. In the embodiment shown in FIG. 1, slots 110-116 are arranged with respect to the left and right edges of cowlings 102 in order to impart momentum in a manner that locally suppresses flow separation along the surfaces of flaps 104A-B, thereby postponing edge vortices that may otherwise form. Alternate embodiments may contain different slot arrangements that omit or modify any of the slots shown in the figure. Slots could be alternately organized such that the spacing between slots is variable (e.g. with the distance between slots increasing toward the trailing edge of flap 104 or airfoil 101), for example, or such any number of slots are arranged in any direction, such as parallel or at an angle to the exhaust flow. Slots 114A-D and 116A-D in FIG. 1, for example, could be alternately designed to be angled at least partially away from the exhaust plume (e.g. at an angle of 20-40 degrees or so) to direct exhaust airflow across a wider section of flap 104. Alternately, such slots could be oriented to be approximately parallel or perpendicular to the exhaust flow. Moreover, the fluid emanating from the slots could be differently oriented (e.g. in any direction perpendicular to the primary axis of the slot, or at any angle). Again, other embodiments may be arranged in any manner.

In practice, then, aircraft 100 produces enhanced lift through exploitation of Coanda Effects produced along a surface of airfoils 101A-B as appropriate. One or more aircraft engines are operated to produce exhaust gases that can be directed along a surface of an airfoil to produce or augment lift. While the majority of the exhaust plume is generally directed with a cowling, nozzle and/or other structure, a portion of exhaust or other compressed fluid emanating from the engine can be ducted to slots 110, 112, 114 and/or 116 as desired to encourage two dimensional flow along the surface of airfoil 101. The fluid ducts may be manually or pre-programmed to automatically activate at any portion of flight; for example, the ducts may be active during takeoffs, landings, and/or other times that flaps 104 or other control surfaces are deployed. In such embodiments, the various ducts may be deactivated during level flight or other periods when enhanced lift is not needed or desired. Further, jets through the slot openings might be adjusted in order to control the injection of fluid at critical locations, depending on flight conditions, engine power setting and/or flap deflection. For example, fluid injection might be administered at different locations (i.e., through segments of slots) and at different intensities and orientations for takeoff, approach to landing, and landing.

Figure 2:
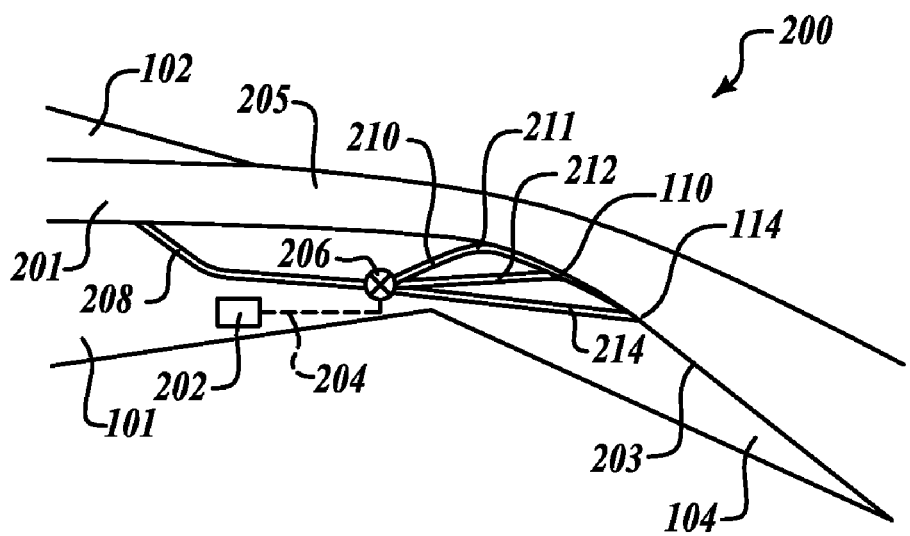
FIG. 2 is a side view of a cut through an exemplary system for controlling engine exhaust flow in an aircraft.

FIG. 2 shows an exemplary duct system 200 capable of providing streams of compressed fluid from an aircraft engine assembly 201 to an outer surface 203 of a wing 101, flap 104 and/or other airfoil as appropriate. As noted above, compressed air, exhaust 205 or other fluid is tapped from a compressor, fan or other portion of engine 101 in one or more input ducts 208. Using a control valve 206, fluid can be allowed or disallowed to flow through ducts 210, 212 and/or 214 as appropriate. Valve 206 may be any sort of mechanically and/or electrically controlled valve capable of being opened, closed and/or otherwise actuated in response to a control signal 204 provided by any sort of control circuitry 202. In various embodiments, control circuitry 202 is a conventional microcontroller circuit that contains suitable hardware, software and/or firmware logic capable of directing the actuation of valve 206 to transmit compressed fluid on the surface 203 of the airfoil 101 as appropriate.

Ducts 208, 210, 212, 214 may be arranged in any manner. In the exemplary embodiment shown in FIG. 2, fluid from a single duct 208 is provided to multiple output ducts 210, 212, 214 by a single valve structure 206. In practice, the number of input and/or output ducts may vary, and may be interconnected in any manner using any number of valves or other inter-connecting structures. As noted above, fluid may be input into duct 208 from any source associated with engine 201. Compressed air could be obtained from an engine compressor or fan, for example, and/or exhaust 205 could be obtained as appropriate. In the exemplary embodiments shown in FIG. 2, a relatively small amount (e.g. on the order of 1-2% or so) of engine exhaust is extracted from the engine exhaust duct and directed within the wing or other airfoil 101 to a flap 104. In other exemplary embodiments, engine fan flow could be used as a fluidic source for controlling engine exhaust; such embodiments may provide an added advantage in that fan bleed can provide cooling of flap and/or airfoil surfaces in addition to enhanced aerodynamic performance. In still other embodiments, compressed air is obtained from any bleed air source, such as a source commonly used to provide bleed air for de-icing, cabin pressurization, pneumatic actuation and/or any other purpose. As such, valve 206 and/or ducts 208, 210, 212, 214 may be implemented using conventional "bleed air" components commonly used for other purposes on many conventional aircraft.

In a conventional STOL application, then, exhaust 205 generated by engine 201 is primarily applied to a surface 203 of a flap 104 and/or other airfoil 101 using a nozzle, cowling 102 and/or other structures as appropriate. As the exhaust curves along surface 203 in accordance with the Coanda Effect, lift is produced. By placing valve structure 206 into a proper position or state, compressed fluid from engine 201 is applied through ducts 208, 210, 212 and/or 214 to slots 110, 114 and/or 211 to prevent exhaust 205 from peeling away from surface 203, which would otherwise reduce the amount of lift produced. As a result, actuation of valve 206 can result in selective enhancement of lift produced with airfoil 101 through improved Coanda Effects of exhaust flowing across surface 203.

Figure 3:
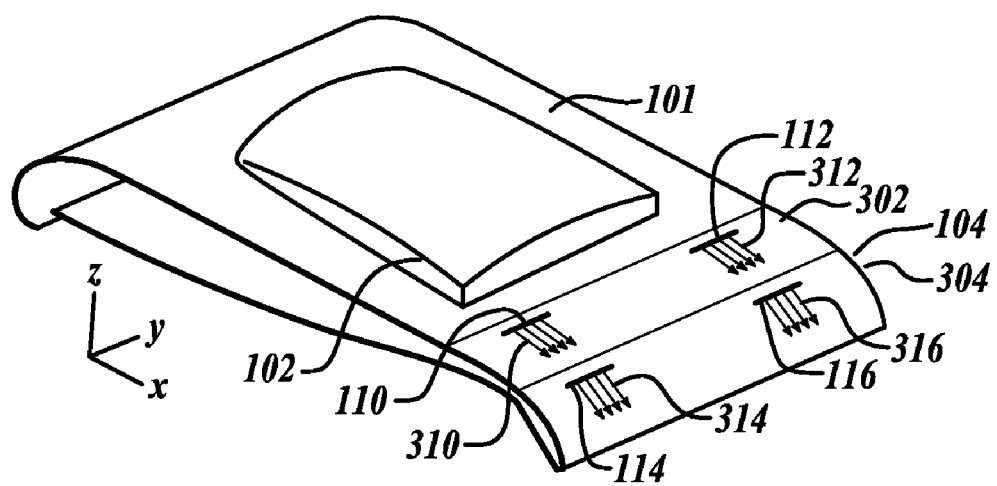
FIG. 3 is a perspective view of an exemplary system for controlling engine exhaust flow along an airfoil.

FIG. 3 shows a perspective view of an exemplary airfoil 101 whereby exhaust emanating from the trailing (aft) edge of cowling 102 could be encouraged to follow the sudden curved region 302 produced due to the downwards deflection of the flap 104 and flap trailing edge 304 through the application of slots 110, 112, 114 and 116. The curved region 302 is sometimes referred to as hinge line. In this embodiment, slots 110 and 112 are formed in the curved region 302, whereas slots 114 and 116 are formed in the mid flap region as appropriate. Slots 110, 112, 114, 116 may be aligned or angled in any manner to affect the exhaust plume emanating from cowling 102. The jets of compressed fluid passing through slots 110, 112, 114, 116 are represented in FIG. 3 with vectors 310, 312, 314, 316, respectively. While FIG. 3 shows each of the slots generally aligned to be parallel to and downstream from the edges of cowling 102, other embodiments (such as that shown in FIG. 1) may align some or all of the slots differently.

Figure 4:
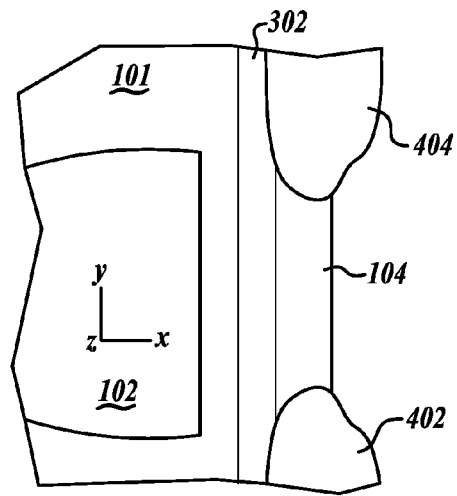
FIGS. 4-7 are top-down views of exemplary implementations of engine exhaust flow systems.
Figure 5:
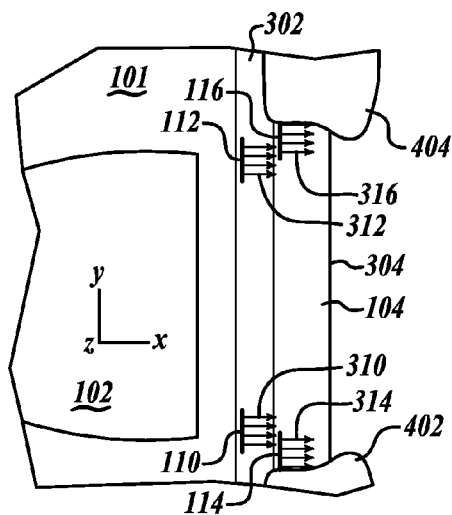
Figure 6:
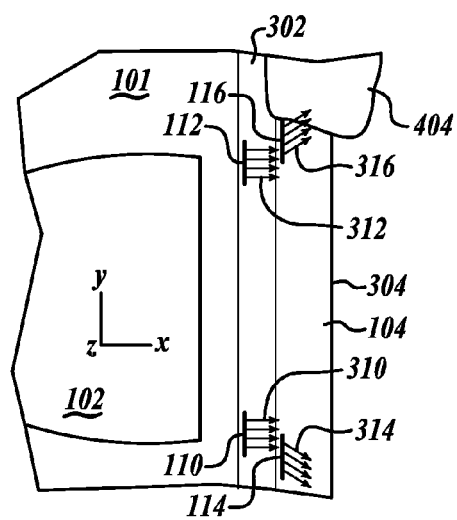
Figure 7:
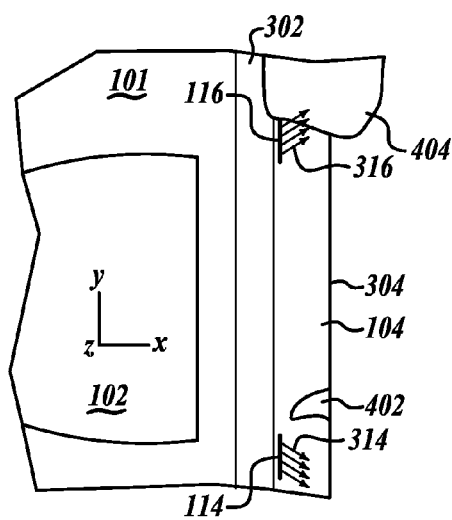

The benefits provided through the application of compressed fluid on the surface of the airfoil can be shown with regard to FIGS. 4-7. FIG. 4, for example, shows the top view of a simulated flowfield with pockets of flow separation 402, 404 in an exemplary embodiment wherein no injected airflow is provided. Here the engine exhaust emanates from the engine cowl 102 and it is directed to the right (as the figure is oriented). By comparing the flow separation bubbles 402, 404 to their counterparts in FIGS. 5-7, the benefits of injected air can be readily noticed. FIG. 5, for example, shows one embodiment wherein four injection slots 110, 112, 114, 116 are actuated to encourage flow attachment to the flap 104 through application of jets 310, 312, 314, 316. As a result of this pattern, smaller separated flow pockets 402, 404 are pushed away from the exhaust plume that is produced aft of cowling 102. In the embodiment of FIG. 5, slots 110 and 114 are associated with the left edge of cowling 102, and slots 112 and 116 are associated with the right edge. Further, slots 110 and 112 may be displaced on a leading edge of a flap 104 or other structure, whereas slots 114 and 116 may be located on the trailing edge, or otherwise located "downstream" of slots 110, 112. Slots 114 and 116 are configured in FIG. 6 to eject radially outward from the edge of cowling 102 (in comparison to groups 110 and 112, respectively) although other embodiments could exhibit more or less alignment between slots. FIG. 7 similarly shows slots 114, 116 and resulting vectors 314, 316 in an alternate configuration without slots 110 and 112.

By comparing the positions and sizes of the flow separation pockets 402 and 404 in FIG. 4 with those in FIG. 5, it is apparent that the injected airflow represented by vectors 310, 312, 314 and 316 enhances flow attachment, thereby resulting in mild three dimensional effects and enhanced streamlining of the engine exhaust 205 around the flap surface 203. Also, engine exhaust is allowed to spread across a wider section of airfoil 101/flap 104, thereby augmenting lift generated by Coanda Effects. Flow separation may be further be suppressed by angling some or all of the injected airflow outwardly away from the exhaust plume, as evidenced by the separated airflows 402, 404 shown in FIG. 6. In the FIG. 6 embodiment, injected airflows 314, 316 are directed outwardly at an angle of approximately 30 degrees with respect to the downstream direction of the exhaust airflow, thereby reducing separation bubbles 402, 404. As noted above, alternate embodiments may provide different numbers, groupings and/or arrangements of injected airflows. FIG. 7, for example, omits slots 110 and 112 shown in the other figures to reduce sizes of separation pockets 402, 404 in comparison to the FIG. 4 embodiment. Many other arrangements and layouts could be created in a vast array of equivalent embodiments. For example, slots could extend from edge to edge of cowling 102 in a direction that is more or less parallel to the trailing edge line of flap 104. Again, some or all of the injected airflows may be manually or automatically activated and deactivated during flight to adjust aircraft performance as desired.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. An aircraft comprising:
   an airfoil having a cowling extending outwardly from a surface of the airfoil, said surface comprising an upper surface of said airfoil;
   an engine coupled to the airfoil and configured to produce exhaust gases that are predominantly directed over the air foil toward an aft end of the aircraft by the cowling as an exhaust plume; and
   a duct extending from the engine to an opening in the surface of the airfoil that is configured to transmit a compressed fluid from the engine to the surface of the airfoil without passing entirely through the cowling, said opening configured for directing said compressed fluid substantially parallel to and along the upper surface of said airfoil to enhance attachment of said exhaust flow to said upper surface of said airfoil.

2. The aircraft of claim 1 further comprising a controller configured to switchably allow the portion of the exhaust gases to pass through the duct in a first operating state of the aircraft.

3. The aircraft of claim 2 wherein the controller is further configured to prevent the portion of exhaust gases from passing through the duct in a second operating state of the aircraft.

4. The aircraft of claim 1 wherein the airfoil comprises an extendable flap having a flap surface, and wherein the duct extends through the flap to the flap surface.

5. The aircraft of claim 4 further comprising a controller configured to allow the portion of exhaust gases to pass through the duct while the flap is extended, and to prevent the portion of the exhaust gases from passing through the duct when the flap is not extended.

6. The aircraft of claim 1 wherein the compressed fluid comprises a portion of the engine exhaust.

7. The aircraft of claim 1 wherein the compressed fluid emanates from a compressor portion of the engine.

8. The aircraft of claim 1 wherein the compressed fluid emanates from a bleed air source of the engine.

9. The aircraft of claim 1 wherein the compressed fluid emanates from a fan portion of the engine.

10. The aircraft of claim 1 wherein the airfoil is a wing, wherein the surface is the upper surface of the wing, and wherein the cowling extends outwardly from the upper surface of the wing such that the aircraft is an upper surface blowing aircraft.

11. An airfoil configured for providing lift to an aircraft having an engine, the airfoil comprising:
    a surface comprising an upper surface of said airfoil;
    an engine cowling extending outwardly from the surface and having an exit plane configured to direct an exhaust plume emanating from the engine across at least a portion of the surface; and
    a plurality of ducts formed in the airfoil and each configured to transmit a compressed fluid from the engine to an opening in the surface of the airfoil, said opening configured for directing said compressed fluid substantially parallel to and along the upper surface of said airfoil to enhance attachment of said exhaust to said upper surface of said airfoil.

12. The airfoil of claim 11 wherein the compressed fluid is switchably transmitted to the surface using the plurality of ducts to thereby suppress flow separation of the exhaust plume along the surface of the airfoil.

13. The airfoil of claim 11 wherein at least a portion of the plurality of ducts are configured to direct the compressed fluid in a direction substantially parallel to and downstream from the cowling.

14. The airfoil of claim 11 wherein at least a portion of the plurality of ducts are configured to direct the compressed fluid in a direction that is at least partially away from the exhaust plume.

15. The airfoil of claim 11 wherein the engine cowling contains a left edge and a right edge, and wherein the plurality of ducts comprises a first group of ducts corresponding to the left edge of the cowling and a second group of ducts corresponding to the right edge of the cowling.

16. The airfoil of claim 15 wherein the first and second groups of ducts are configured to direct the compressed fluid in a direction substantially parallel to and downstream from the cowling.

17. The airfoil of claim 16 wherein the plurality of ducts further comprises a third group of ducts corresponding to the left edge of the cowling and a fourth group of ducts corresponding to the right edge of the cowling, and wherein the third and fourth groups of ducts are configured to direct the compressed fluid in a direction that is at least partially away from the exhaust plume.

18. A method for increasing the lift produced along a surface of an airfoil of an aircraft having an engine, the method comprising the steps of:
    operating the engine to thereby produce exhaust gases;
    directing a majority of the exhaust gases along the surface of the airfoil, said surface comprising an upper surface of said airfoil; and
    switchably activating a duct that extends from the engine to an opening in the surface of the airfoil to thereby transmit a compressed fluid from the engine to the surface and to suppress flow separation along the surface while the duct is activated, said opening configured for directing said compressed fluid substantially parallel to and along said upper surface of said airfoil to enhance attachment of said exhaust to said upper surface of said airfoil.

19. The method of claim 18 further comprising the step of subsequently deactivating the duct to discontinue transmission of the compressed fluid.

20. The method of claim 19 wherein the activating step occurs while a flap structure associated with the airfoil is deployed, and wherein the deactivating step occurs when the flap structure is not deployed.

* * * * *